United States Patent
Jones et al.

(10) Patent No.: US 11,060,409 B2
(45) Date of Patent: Jul. 13, 2021

(54) CERAMIC MATRIX COMPOSITE AEROFOIL WITH IMPACT REINFORCEMENTS

(71) Applicant: Rolls-Royce plc, London (GB)

(72) Inventors: Edward M. Jones, London (GB); Michael J. Whittle, London (GB); James C. Smith, London (GB); Emma C. Steedman, London (GB); Ian Edmonds, London (GB)

(73) Assignee: Rolls-Royce plc

( * ) Notice: Subject to any disclaimer, the term of this patent is extended or adjusted under 35 U.S.C. 154(b) by 66 days.

(21) Appl. No.: 16/410,467

(22) Filed: May 13, 2019

(65) Prior Publication Data

US 2020/0362706 A1    Nov. 19, 2020

(51) Int. Cl.
*F01D 5/28*    (2006.01)
*F01D 9/02*    (2006.01)
(Continued)

(52) U.S. Cl.
CPC ........ *F01D 5/282* (2013.01); *C04B 35/62844* (2013.01); *C04B 35/80* (2013.01);
(Continued)

(58) Field of Classification Search
CPC .......... F01D 5/147; F01D 5/284; F01D 5/189; F01D 5/28; F01D 5/286; F01D 5/18; F01D 5/14; F01D 5/146; F01D 5/188; F01D 5/282; F01D 9/02; F01D 9/041; F01D 9/065; F01D 25/005; F05D 2300/702; F05D 2230/20; F05D 2300/603; F05D 2300/6033; F05D 2230/60; F05D 2300/6012; F05D 2230/23; F05D 2230/30; F05D 2230/50; F05D 2230/31; F05D 2240/12; F05D 2240/122; F05D 2240/303; F05D 2240/30; F04D 29/324; C04B 35/80; C04B 35/62844; C04B 2235/5244; C04B 2235/5256; F05C 2253/04

See application file for complete search history.

(56) References Cited

U.S. PATENT DOCUMENTS 5,488,017 A    1/1996    Szweda et al.
6,314,858 B1    11/2001    Strasser et al.
(Continued)

FOREIGN PATENT DOCUMENTS

EP    1768893 A2    4/2007
EP    3064715 A1    9/2016
(Continued)

OTHER PUBLICATIONS

Extended European Search Report, European Application No. 20170309. 7-1004, dated Aug. 24, 2020, 7 pages.

*Primary Examiner* — J. Todd Newton
*Assistant Examiner* — Eric J Zamora Alvarez
(74) *Attorney, Agent, or Firm* — Barnes & Thornburg LLP

(57) ABSTRACT

A turbine blade of ceramic matrix composite material construction adapted for use in a gas turbine engine includes an airfoil assembly. The airfoil assembly includes an airfoil and at least one reinforcement inset coupled to the airfoil assembly. The reinforcement inset is configured to resist damage to the airfoil assembly due to objects impacting the airfoil assembly.

12 Claims, 5 Drawing Sheets

(51) Int. Cl.
  *F01D 9/04* (2006.01)
  *F01D 21/04* (2006.01)
  *C04B 35/628* (2006.01)
  *C04B 35/80* (2006.01)

(52) U.S. Cl.
  CPC ........ *F01D 9/02* (2013.01); *C04B 2235/5244* (2013.01); *C04B 2235/5256* (2013.01); *F05C 2253/04* (2013.01); *F05D 2230/20* (2013.01); *F05D 2240/12* (2013.01); *F05D 2240/30* (2013.01)

(56) References Cited

U.S. PATENT DOCUMENTS

| | | |
|---|---|---|
| 6,451,416 B1 | 9/2002 | Holowczak et al. |
| 7,066,717 B2 | 6/2006 | Morrison et al. |
| 7,186,092 B2 | 3/2007 | Bruce et al. |
| 8,167,573 B2 * | 5/2012 | Merrill .................... F01D 5/288 416/229 A |
| 8,215,900 B2 | 7/2012 | Morrison |
| 8,715,439 B2 | 5/2014 | Chakrabarti et al. |
| 8,807,931 B2 | 8/2014 | Roberts |
| 8,814,527 B2 | 8/2014 | Huth et al. |
| 9,470,097 B2 | 10/2016 | Hodgson et al. |
| 9,765,634 B2 | 9/2017 | Fameau et al. |
| 9,816,381 B2 | 11/2017 | Cortequisse |
| 9,903,211 B2 | 2/2018 | Perez |
| 2015/0041590 A1 | 2/2015 | Kirtley et al. |
| 2015/0377046 A1 | 12/2015 | Duelm et al. |
| 2017/0328217 A1 * | 11/2017 | Gallier .................. F01D 25/005 |
| 2018/0045063 A1 | 2/2018 | Frey et al. |
| 2018/0065337 A1 * | 3/2018 | Grasso .................... B32B 15/04 |

FOREIGN PATENT DOCUMENTS

| | | |
|---|---|---|
| WO | 2006052278 A2 | 5/2006 |
| WO | 19005121 | 1/2019 |

* cited by examiner

CERAMIC MATRIX COMPOSITE AEROFOIL WITH IMPACT REINFORCEMENTS

FIELD OF THE DISCLOSURE

The present disclosure relates generally to gas turbine engines, and more specifically to aerofoil components within gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Aerofoil shaped components within the compressor and turbine sections interact with gases flowing through the gas turbine engine. Some examples of an aerofoil shaped components in a gas turbine engine are vanes and rotating blades. Vanes are typically static and direct gases toward the rotating blades. Some rotating blades interact with products of the combustion reaction in the combustor such that the combustion reaction products heat the blades and cause them to experience very high temperatures. The blades may be made from high-temperature compatible materials such as composite materials. Design and manufacture of aerofoils from composite materials remains an area of interest.

SUMMARY

The present disclosure may comprise one or more of the following features and combinations thereof.

According to one aspect of the present disclosure, an airfoil assembly for use in a gas turbine engine includes an airfoil, and at least one reinforcement inset. The airfoil includes ceramic matrix composite materials and extends radially relative to an axis. The airfoil has a leading edge, a trailing edge spaced apart axially from the leading edge, a pressure side interconnecting the leading edge and the trailing edge, and a suction side spaced apart circumferentially from the pressure side and interconnecting the leading edge and the trailing edge. The airfoil is shaped to define an inner surface that forms an internal cavity for receiving cooling air therein and an outermost surface configured to interact with hot gases conducted through the gas turbine engine.

In some embodiments, a first reinforcement inset is at least partially located in the suction side of the airfoil between the inner surface and the outermost surface to resist damage to the airfoil assembly due to objects impacting the airfoil assembly. The first reinforcement inset includes at least one material different than the ceramic matrix composite materials, In some embodiments, the ceramic matrix composite materials of the airfoil surround the first reinforcement inset such that the entire reinforcement inset is in direct contact with the ceramic matrix composite material of the airfoil to cause the first reinforcement inset to be insulated from the hot gases.

In some embodiments, a second reinforcement inset is located in the leading edge of the airfoil between the inner surface and the outermost surface to resist damage to the airfoil assembly due to objects impacting the airfoil assembly. The ceramic matrix composite materials of the airfoil surround the second reinforcement inset such that the entire reinforcement inset is in direct contact with the ceramic matrix composite material of the airfoil to cause the second reinforcement inset to be insulated from the hot gases.

In some embodiments, the first reinforcement inset is discrete from the second reinforcement inset.

In some embodiments, the airfoil includes a first layer of ceramic matrix composite materials and a second layer of ceramic matrix composite materials arranged around the first layer of ceramic matrix composite materials, the first layer of ceramic matrix composite materials and the second layer of ceramic matrix composite materials are airfoil shaped. The first reinforcement insert is located between the first layer of ceramic matrix composite materials and the second layer of ceramic matrix composite materials.

In some embodiments, the entire first reinforcement inset is located in the suction side of the airfoil.

In some embodiments, the first reinforcement inset extends between a first end and a second end and includes a curvilinear outer inset surface and a curvilinear inner inset surface that contact each other to form a first point at the first end and a second point at the second end.

In some embodiments, the first reinforcement inset is located in at least one of the suction side, pressure side, and trailing edge of the airfoil.

In some embodiments, the first reinforcement inset includes a first side surface, a second side surface, and a receiver surface. The first side surface and the second side surface converge toward one another and meet at adjacent the trailing edge of the airfoil. The receiver surface is concave and contacts directly the first side surface and the second side surface to interconnect the first side surface and the second side surface.

In some embodiments, the first reinforcement inset comprises at least one of silicon carbide fibre, silicon carbide nitride, a monofilament titanium ceramic matrix composite, a safricon fibre, a non-oxide ceramic fibre, and an ultra-high temperature ceramic matrix composite material.

According to another aspect of the present disclosure, an airfoil assembly includes an airfoil and at least one reinforcement inset. The airfoil includes a first layer of ceramic matrix composite materials and a second layer of ceramic matrix composite materials arranged around the first layer. The first layer contacts the second layer at a first location and a second location spaced apart from the first location. The first layer is spaced apart from the second layer at a third location between the first location and second location to define a inset-receiving space between the first location and the second location.

In some embodiments, the reinforcement inset is located in the inset-receiving space between the first layer and the second layer and engaged with the first layer and the second layer.

In some embodiments, the reinforcement inset contacts directly the first layer and the second layer.

In some embodiments, the reinforcement inset is crescent shaped.

In some embodiments, the second layer provides the outermost surface of the airfoil assembly, the first layer has a first thickness, the second layer has a second thickness, and the first thickness is greater than the second thickness.

In some embodiments, the reinforcement inset extends between a first end and a second end and includes a first surface, a second surface, and a third surface. The first surface and the second surface converge toward one another and meet at the first end. The third surface is located at the second end is concave and contacts directly the first surface and the second surface.

In some embodiments, the airfoil has a leading edge, a trailing edge spaced apart axially from the leading edge, a pressure side interconnecting the leading edge and the trailing edge, and a suction side spaced apart circumferentially from the pressure side and interconnecting the leading edge and the trailing edge, and the reinforcement inset is located in the leading edge of the airfoil.

In some embodiments, the airfoil has a leading edge, a trailing edge spaced apart axially from the leading edge, a pressure side interconnecting the leading edge and the trailing edge, and a suction side spaced apart circumferentially from the pressure side and interconnecting the leading edge and the trailing edge, and the reinforcement inset extends a least partway along the suction side of the airfoil toward the trailing edge.

According to another aspect of the present disclosure, a method includes: forming a first airfoil preform comprising ceramic fibers; forming a second airfoil preform comprising ceramic fibers; forming a reinforcement preform comprising impact resistant fibers; locating the first airfoil preform in the second airfoil preform; locating the reinforcement preform between the first airfoil preform and the second airfoil preform; and infiltrating the first airfoil preform, the second airfoil preform, and the reinforcement preform simultaneously with ceramic matrix to provide an airfoil.

In some embodiments, the method further includes engaging the first airfoil preform with the second airfoil preform in at least two locations during the infiltrating step.

In some embodiments, the method further includes engaging directly the second airfoil preform and the first airfoil preform with the reinforcement preform during the infiltration step.

These and other features of the present disclosure will become more apparent from the following description of the illustrative embodiments.

DETAILED DESCRIPTION OF THE DRAWINGS

Figure 1:
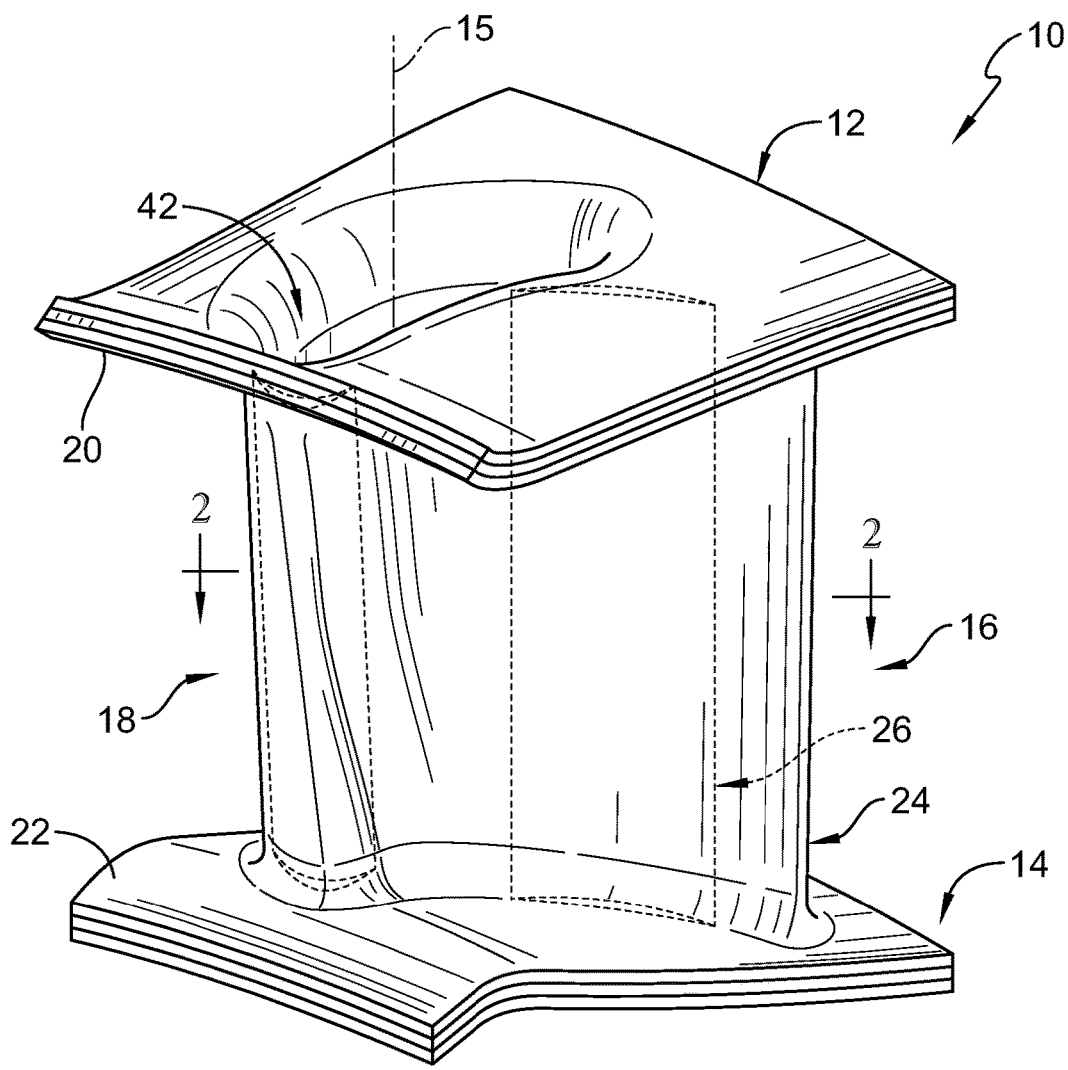
FIG. 1 is a perspective view of a turbine vane in accordance with the present disclosure including an aerofoil made of ceramic matrix composite materials and suggesting that the vane includes reinforcement insets located within the aerofoil to resist damage to the aerofoil due to particles impacting the aerofoil.

For the purposes of promoting an understanding of the principles of the disclosure, reference will now be made to a number of illustrative embodiments illustrated in the drawings and specific language will be used to describe the same.

An illustrative vane 10 adapted for use in a gas turbine engine is constructed of ceramic matrix composite material (CMC) and extends along an axis 15 as shown in FIG. 1. The vane 10 includes an outer end wall 12, an inner end wall 14, and an aerofoil assembly 16. The outer end wall 12 and the inner end wall 14 cooperate to define a flow path 18 axially between an inner surface 20 of the outer end wall 12 and an outer surface 22 of the inner end wall 14. In the illustrative embodiment, the vane 10 is a nozzle guide vane used in a turbine section of a gas turbine engine. However, in other embodiments, the vane 10 may be located in other areas of the gas turbine engine.

Figure 2:
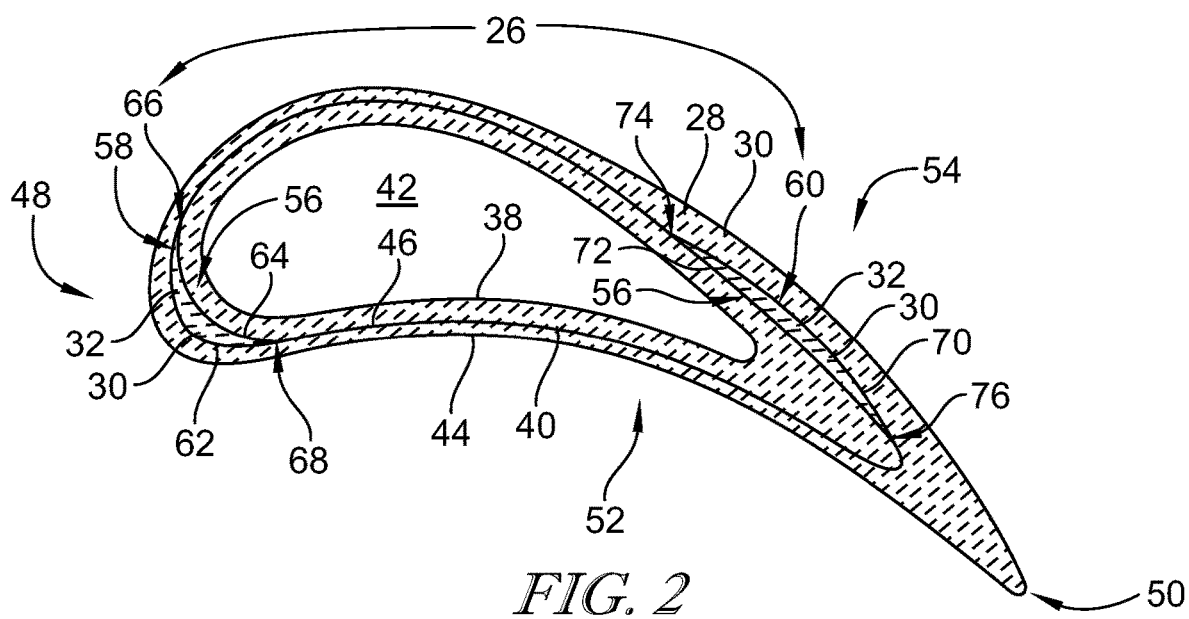
FIG. 2 is a cross sectional view of the turbine vane of FIG. 1 showing a first reinforcement inset located within the aerofoil along a suction side of the aerofoil near the trailing edge and a second reinforcement inset located within the aerofoil along a leading edge of the aerofoil.
Figure 3:
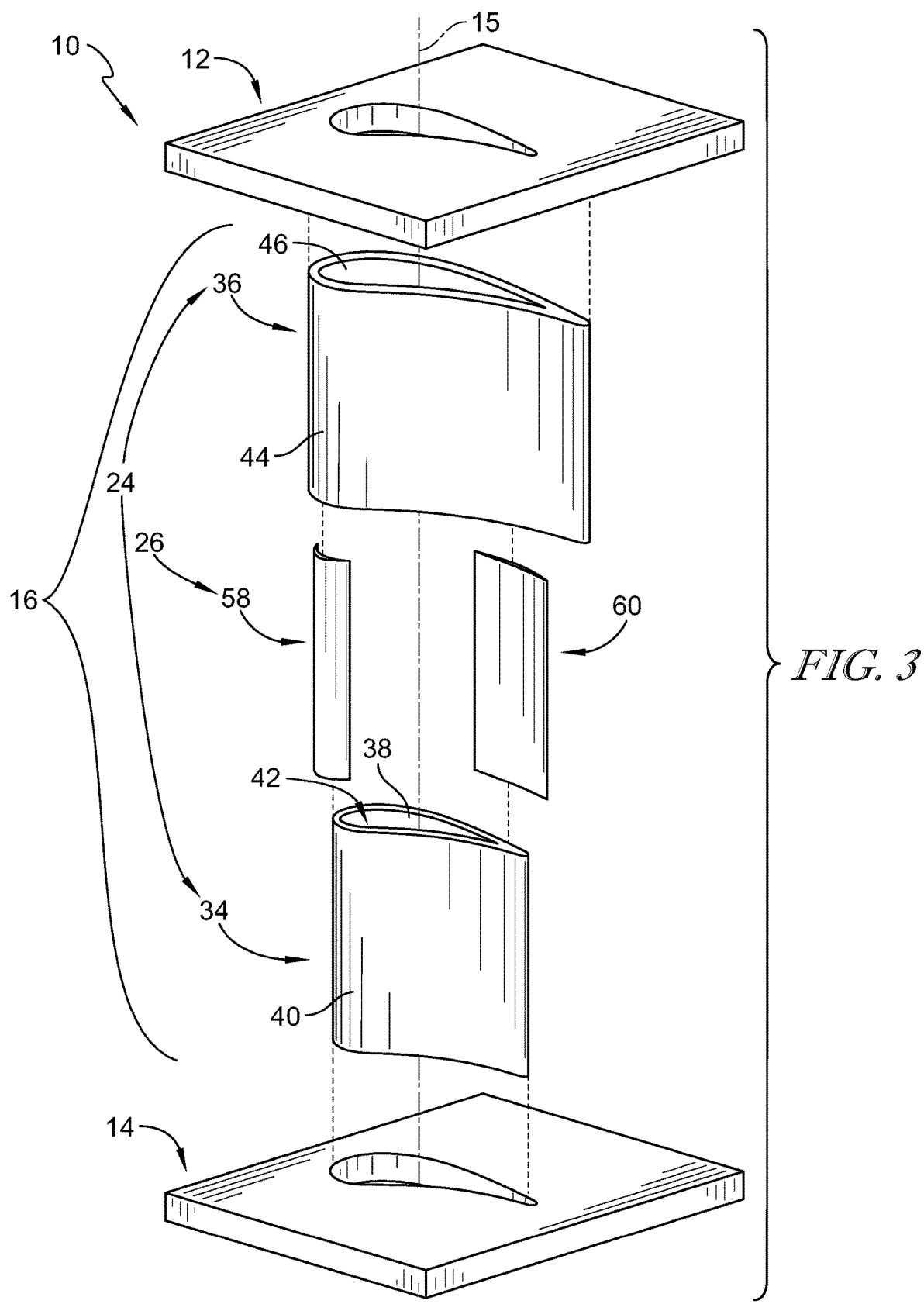
FIG. 3 is an exploded assembly view of the turbine vane of FIGS. 1 and 2 showing that the turbine vane includes, from top to bottom, an outer end wall, an outer aerofoil layer, at least one reinforcement inset, an inner aerofoil layer, and an inner end wall.

The aerofoil assembly 16 extends axially between the outer end wall 12 and the inner and wall through the flow path 18. The aerofoil assembly 16 includes an aerofoil 24 that is shaped to interact with gases flowing through the flow path 18 and at least one reinforcement inset 26 (i.e. reinforcement insets 58, 60) interlaid in the aerofoil 24 as shown in FIGS. 1-3. The aerofoil 24 is made from ceramic matrix composite materials (CMC) such as, for example, silicon carbide fibres suspended in a silicon carbide matrix. The ceramic materials forming the aerofoil 24 provide for insulation from the hot gases flowing though the flow path 18. However, some ceramic materials may have decreased resistance to stresses and impacts from objects and particles in the flow path 18. The at least one reinforcement inset 26 is positioned in a discrete location relative to the aerofoil 24 to resist damage to the aerofoil 24 due to objects impacting the aerofoil 24.

In the illustrative embodiment, the aerofoil 24 is formed from at least one fibre preform 28 that is molded into an aerofoil cross-sectional shape, as shown in FIG. 2, and then processed with ceramic material 30 to form the aerofoil 24, such as through chemical vapor infiltration, slurry/melt infiltration, and/or another suitable CMC forming process. In the illustrative embodiment, a pair of two dimensional ply preforms 28 are used to form the aerofoil cross-sectional shape and then processed as described above to form the aerofoil 24 as shown in FIG. 3. In other embodiments, a single three-dimensional woven or braided preform may be used to form the aerofoil cross-sectional shape and then processed as described above to form the aerofoil 24.

Prior to the preform(s) 28 being processed with ceramic material 30, the preform 28 is interlaid with the at least one reinforcement inset 26 as shown in FIG. 2. The reinforcement inset 26 includes a fibre preform 32 made from a ceramic material that is different than the fibre preform 28 used to construct the aerofoil 24. The ceramic material of the preform 32 of the reinforcement inset 26 has increased resistance to impacts. Alternatively, one or more of the reinforcement insets 26 may comprise a metallic material.

Some types of ceramic materials with increased impact resistance include a silicon carbide ultra fibre, a silicon carbide nitride, a monofilament titanium ceramic matrix composite, a safricon fibre, a non-oxide ceramic fibre, an ultra-high temperature ceramic matrix composite, or another suitable ceramic matrix composite material with increased impact resistance. In the illustrative embodiment, the preform 28 of the aerofoil 24 and the preform 32 of the reinforcement inset(s) 26 are assembled and then infiltrated at the same time with ceramic material 30 at the same time to provide an integral, one-piece vane 10. However, in other embodiments, each preform 28, 32 may be infiltrated with ceramic material individually and then assembled to form the vane 10.

In the illustrative embodiment, the aerofoil 24 includes a first layer 34 and a second layer 36 as shown in FIG. 3. The first layer 34 has an inner surface 38 that defines an internal cavity 42 for conducting cooling air therein and an outer surface 40 opposite the inner surface 38. The second layer 36 has an outer surface 44 that faces away from the first layer 34 and an inner surface 46 that faces toward the first layer 34. The second layer 36 is sized such that the outer surface 40 of the first layer 34 and the inner surface 46 of the second layer 36 at least partially engage one another when the vane 10 is assembled. As a whole, aerofoil 24 has a leading edge 48, a trailing edge 50 spaced apart axially from the leading edge 48, a pressure side 52 interconnecting the leading edge 48 and the trailing edge 50, and a suction side 54 spaced apart circumferentially from the pressure side 52 and interconnecting the leading edge 48 and the trailing edge 50.

The first and second layers 34, 36 are shaped such that the outer surface 40 of the first layer 34 and the inner surface 46 of the second layer 36 are partially spaced apart from one another to define at least one inset-receiving space 56 when the vane 10 is assembled as shown in FIG. 2. In other embodiments, the aerofoil 24 may include only one layer that is then formed to include the at least one inset-receiving space 56 such as by machining the layer after infiltration or three-dimensionally forming the layer prior to infiltration.

The at least one inset-receiving space 56 is provided in discrete locations in the aerofoil 24 to provide resistance to impacts from objects where the risk for impact may be greater compared to the rest of the aerofoil 24. A first embodiment of a vane 10, in accordance with the present disclosure, includes a first reinforcement inset 58 positioned at a leading edge of the aerofoil 24 and a second reinforcement inset 60 positioned along the suction side of the aerofoil 24 near the trailing edge as shown in FIG. 2. Although the aerofoil 24 is shown with both the first reinforcement inset 58 and the second reinforcement inset 60, either of the reinforcement insets 58, 60 may be omitted from the aerofoil 24.

In other embodiments, the reinforcement insets may be positioned in other locations in the aerofoil 24. The reinforcement insets 58, 60 are located within the aerofoil 24 and do not form an outermost surface of the aerofoil 24. A portion of the first layer 34 may be damaged during operation of the aerofoil 24 due to debris and particles impacting the aerofoil 24. A portion or an entire surface of the reinforcement insets 58, 60 may be exposed to the flow path 18. The reinforcement insets 58, 60 are configured to survive if they become exposed to the flow path 18. The reinforcement insets 58, 60 are also spaced apart from the second layer 36 such that the reinforcement insets 58, 60 do not form the inner most surface of the aerofoil 24 unless damage is done to the second layer 36 exposing the reinforcement insets 58, 60.

The first and second reinforcement insets 58, 60 are located entirely between the first and second layers 34, 36 and have shapes that generally correspond to the outer surface 44 of the second layer 36. The first reinforcement inset 58 has a crescent shaped cross-section when viewed axially relative to the axis 15 and reinforces the leading edge 48 of the aerofoil 24. The second reinforcement inset 60 also has a slight crescent shaped cross-section when viewed axially relative to the axis 15 except the crescent shape of the second reinforcement inset 60 is not as pronounced as the crescent shape of the first reinforcement inset 58.

The first reinforcement inset 58 has a curved outer surface 62 engaged with the inner surface 46 of the second layer 36 and a curved inner surface 64 engaged with the outer surface 40 of the first layer 34 as shown in FIG. 2. The outer surface 62 and the inner surface 64 converge at both ends of the surfaces 62, 64 to form points 66, 68. The first reinforcement inset 58 has a maximum thickness located generally at a center of the reinforcement inset 58. The reinforcement inset 58 has the maximum thickness directly in line with the leading edge 48 of the aerofoil 24. The thickness of the reinforcement inset tapers gradually as the reinforcement inset 58 extends away from the center of the reinforcement inset 58 toward the points 66, 68. The outer surface 62 has a greater slope compared to the inner surface 64 due to the changing thickness of the reinforcement inset 58.

The second reinforcement inset 60 is located entirely on the suction side 54 of the aerofoil 24 as shown in FIG. 2. The second reinforcement inset 60 has a curved outer surface 70 engaged with the inner surface 46 of the second layer 36 and a curved inner surface 72 engaged with the outer surface 40 of the first layer 34. The outer surface 70 and the inner surface 72 converge at both ends of the surfaces 70, 72 to form points 74, 76. The second reinforcement inset 60 has a maximum thickness located generally at a center of the reinforcement inset 60. The maximum thickness of the reinforcement inset 60 is located between the leading edge 48 and the trailing edge 50 along the pressure side 52 of the aerofoil 24. The thickness of the reinforcement inset 60 tapers gradually as the reinforcement inset 60 extends away from the center of the reinforcement inset 60 toward the points 74, 76.

In one embodiment, the maximum thickness of the reinforcement inset 60 is spaced apart from the trailing edge 50 of the aerofoil 24 within a range of about 15 percent of the length between the trailing edge 50 and the leading edge 48 to about 35 percent of the length between the trailing edge 50 and the leading edge 48. In another embodiment, the maximum thickness of the reinforcement inset 60 is spaced apart from the trailing edge 50 of the aerofoil 24 about 25 percent of the length between the trailing edge 50 and the leading edge 48.

Figure 4:
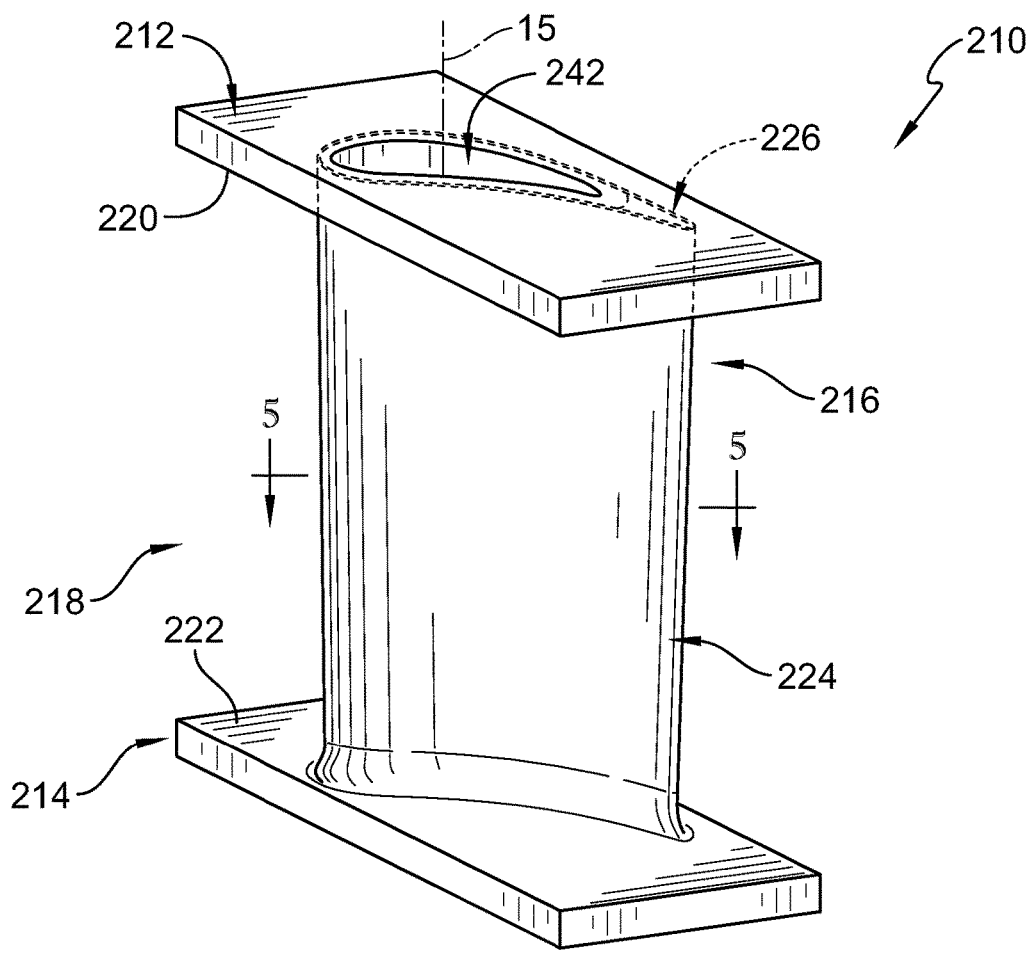
FIG. 4 is a perspective view of another turbine vane in accordance with the present disclosure including an aerofoil made of ceramic matrix composite materials and at least one reinforcement inset located within the aerofoil to resist damage to the aerofoil due to objects impacting the aerofoil.
Figure 5:
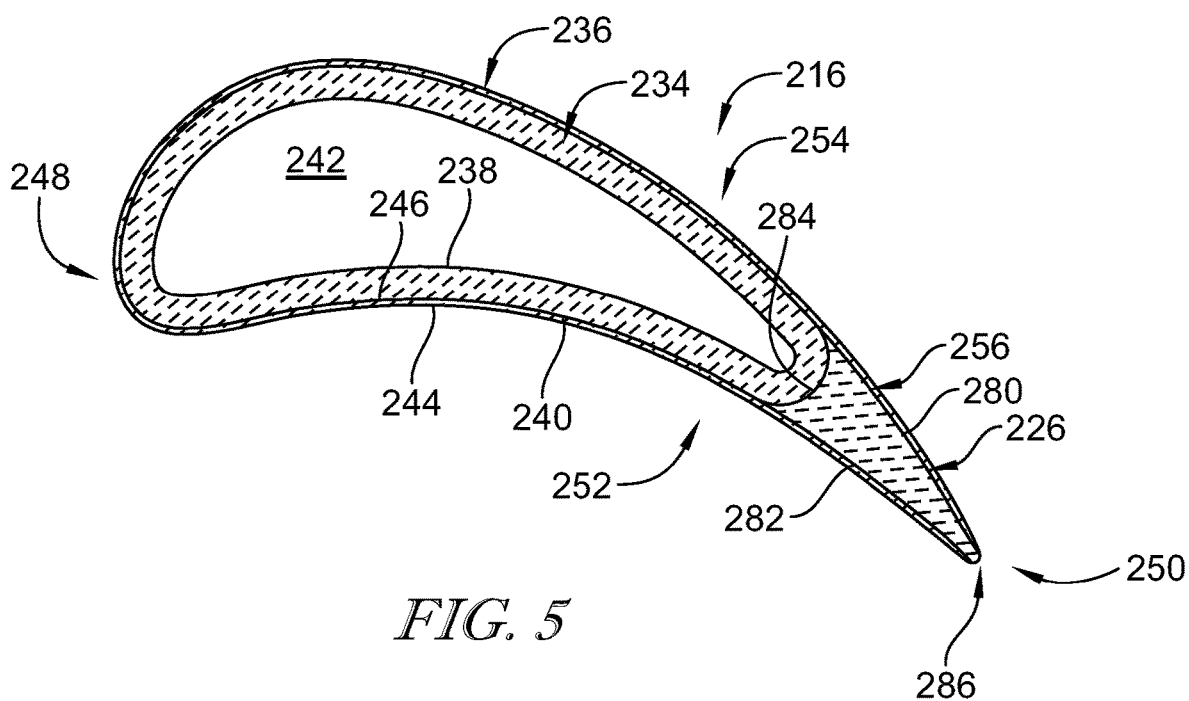
FIG. 5 is a cross sectional view of the turbine vane of FIG. 4 showing a reinforcement inset located within the aerofoil at a trailing edge of the aerofoil along both the pressure side and suction side.
Figure 6:
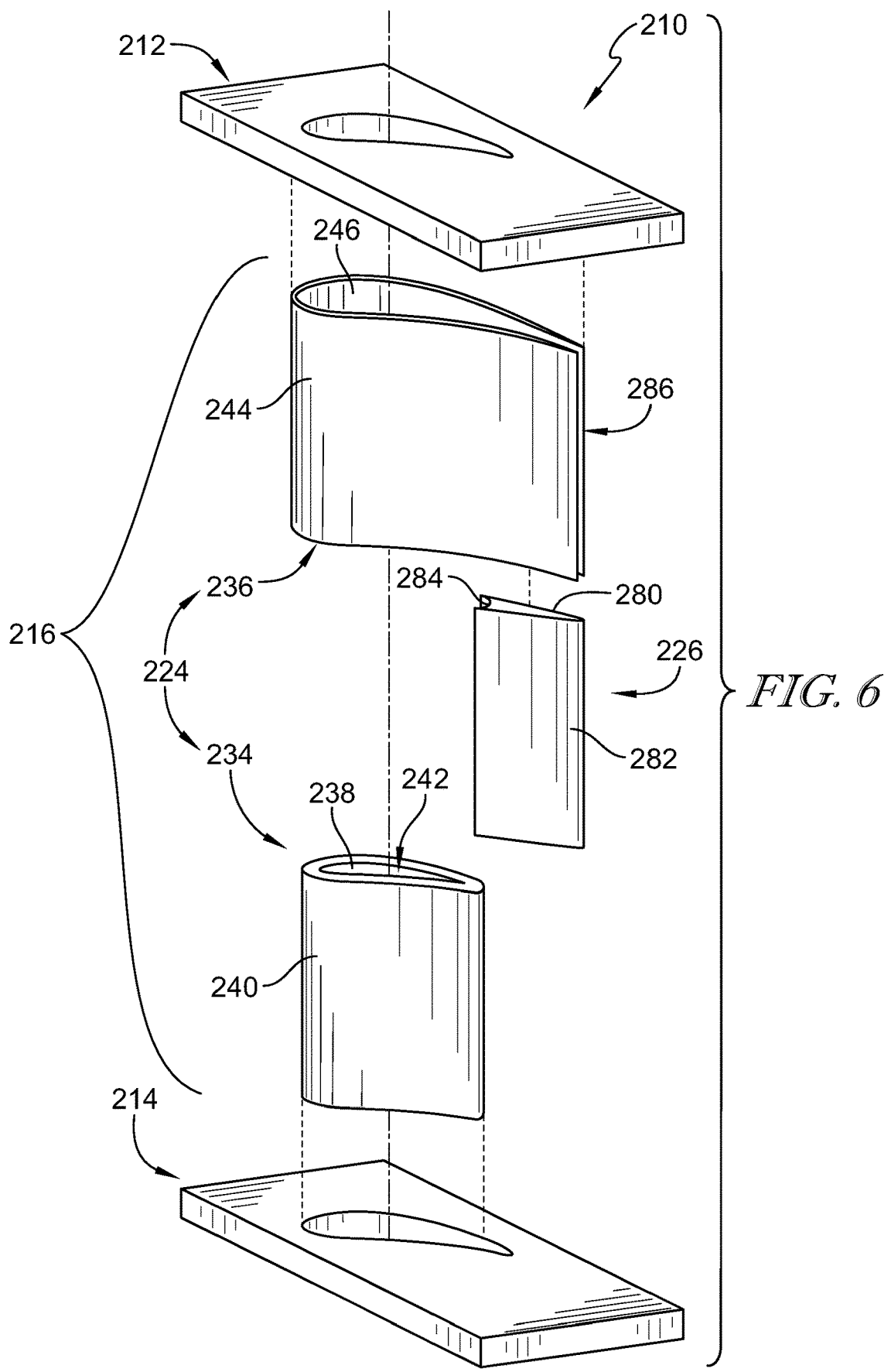
FIG. 6 is an exploded assembly view of the turbine vane of FIGS. 4 and 5 showing that the turbine vane includes, from top to bottom, an outer end wall, an outer aerofoil layer, the trailing edge reinforcement inset, an inner aerofoil layer, and an inner end wall.

Another embodiment of a vane 210 in accordance with the present disclosure is shown in FIGS. 4-6. The vane 210 is substantially similar to the vane 10 shown in FIGS. 1-3 and described above. Accordingly, similar reference numbers are used to describe similar features common between vane 10 and vane 210. Reference is hereby made to the description above for those similar features between vane 10 and vane 210 and the differences between vane 10 and vane 210 are described below.

The vane 210 includes an outer end wall 212, an inner end wall 214, and an aerofoil assembly 216. The outer end wall 212 and the inner end wall 214 cooperate to define a flow path 218 radially between an inner surface 220 of the outer end wall 212 and an outer surface 222 of the inner end wall 214. The aerofoil assembly 216 extends radially between the outer end wall 212 and the inner and wall through the flow path 218. The aerofoil assembly 216 includes an aerofoil 224 that is shaped to interact with gases flowing through the flow path 218 and at least one reinforcement inset 226 interlaid in the aerofoil 224 as shown in FIG. 5. The reinforcement inset 226 is positioned in a discrete location relative to the aerofoil 224 to resist damage to the aerofoil due to objects impacting the aerofoil 224.

The aerofoil 224 includes a first layer 234 and a second layer 236 as shown in FIGS. 5 and 6. The first layer 234 has an inner surface 238 that defines an internal cavity 242 for conducting cooling air therein and an outer surface 240 opposite the inner surface 238. The second layer 236 has an outer surface 244 that faces away from the first layer 234 and an inner surface 246 that faces toward the first layer 234. As a whole, aerofoil 224 has a leading edge 248, a trailing edge 250 spaced apart axially from the leading edge 248, a pressure side 252 interconnecting the leading edge 248 and the trailing edge 250, and a suction side 254 spaced apart circumferentially from the pressure side 252 and interconnecting the leading edge 248 and the trailing edge 250.

The first layer 234 is thicker than the second layer 236 as shown in FIG. 2; however, in other embodiments, the thicknesses of the layers 234, 236 may be the same or the first layer 234 may be thinner than the second layer 236. The second layer 236 extends further aft from the first layer 234 to define the trailing edge 250 of the aerofoil 224. At the trailing edge 250 of the aerofoil 224, the inner surface 246 of the second layer 236 along the pressure side 252 is spaced apart from the inner surface 246 of the second layer 236 along the suction side to provide an inset-receiving space 256 therebetween. The reinforcement inset 226 is positioned within the inset-receiving space 256 to provide increased impact resistance for the trailing edge 250 of the aerofoil 224.

The reinforcement inset 226 has features that are located along the suction side 254, the pressure side 252, and the trailing edge 250 of the aerofoil 224 as shown in FIGS. 5 and 6. The reinforcement inset 226 includes a first side surface 280, a second side surface 282, and a receiver surface 284. The first side surface 280 is located along the suction side 254 while the second side surface 282 is location along the pressure side 252. The first side surface 280 and the second side surface 282 converge toward one another and meet at the trailing edge 250 of the aerofoil 224. The receiver surface 284 is concave and interconnects directly the first side surface 280 and the second side surface 282. The first side surface 280 and the second side surface 282 engage the inner surface 246 of the second layer 236. The receiver surface 284 engages the outer surface 240 of the first layer 234.

In the illustrative embodiment, the second layer 236 has a small gap 286 at the trailing edge 250 as shown in FIG. 5. The reinforcement inset 226 extends into the gap 286 such that the reinforcement inset 226 is partially exposed to the hot gases in the flowpath 218 directly at the trailing edge 250. In other embodiments, the second layer 236 may completely surround the first layer 234 and the reinforcement inset 226 so that the gap 286 is omitted.

Figure 7:
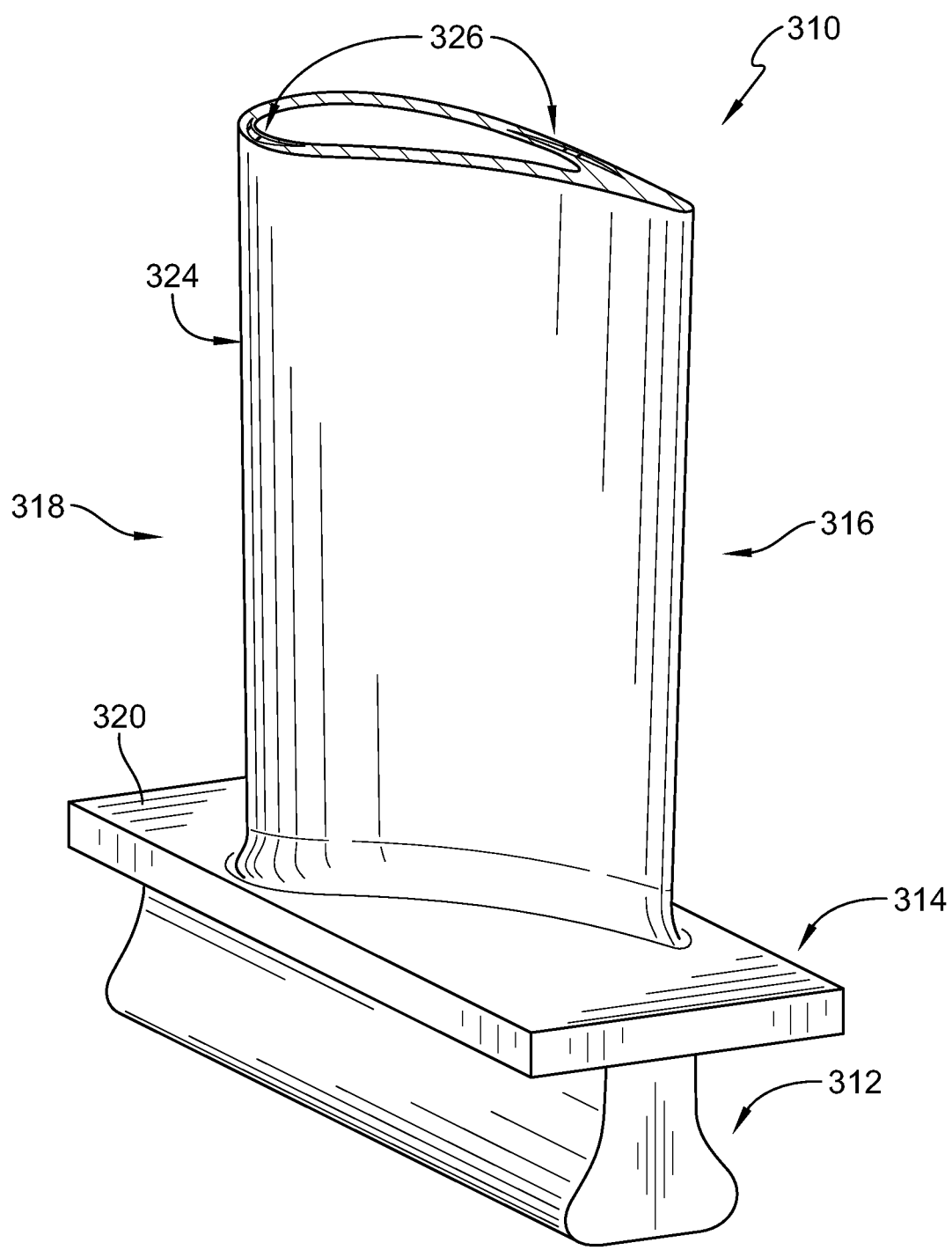
FIG. 7 is a perspective view of a blade in accordance with the present disclosure including an aerofoil made of ceramic matrix composite materials and reinforcement insets located within the aerofoil to resist damage to the aerofoil due to objects impacting the aerofoil.

A blade 310 in accordance with the present disclosure is shown in FIG. 7. The blade 310 includes a root 312, a platform 314, and an aerofoil assembly 316. The root 312 is adapted to attach to a disk (not shown) within a gas turbine engine for rotation with the disk in response to operation of the gas turbine engine. The platform 314 provides a radially-inner boundary 320 for a flow path 318 to block hot gases from reaching the root 312 and the disk to which the root 312 is attached. The aerofoil assembly 316 is substantially similar to the aerofoil assemblies 16, 216 described above, except that the aerofoil assembly 316 is mounted for rotation in the gas turbine engine.

The aerofoil assembly 316 includes an aerofoil 324 and at least one reinforcement inset 326 coupled to the aerofoil 324 as shown in FIG. 7. The aerofoil 324 is shaped to interact with gases flowing through the flow path 318. The at least one reinforcement inset 326 is configured to increase impact resistance of the aerofoil 324. The at least one reinforcement inset may include the first reinforcement inset 58 from vane 10, the second reinforcement inset 60 from vane 10, and/or the reinforcement inset 226 from vane 210. Accordingly the disclosure above related to reinforcement insets 58, 60, and 226 are hereby incorporated herein for use with the blade 310. Any of the reinforcement insets 58, 60, and 226 may be disposed within the aerofoil 324 including combinations of the reinforcement insets 58, 60, and 226.

In some embodiments, the present disclosure includes a method of manufacture to improve a component's impact tolerance when made from Ceramic Matrix Composite (CMC) material. This improvement is produced by thickening up vulnerable areas with a separate material which features superior impact resistance.

In some embodiments, the incumbent material in use in gas turbine engines is comprised of a metallic super-alloy. These materials may have a superior impact tolerance compared to ceramic composites. Ceramic matrix composites may feature excellent properties when subjected to high temperatures compared to the conventional material of choice for gas turbine engines (i.e. Nickel based alloys). This benefit allows for a reduction in cooling air flow to be used, resulting in an increase in thermal efficiency, thus improving specific fuel capacity. The turbine region of the gas turbine engine that is both hot enough to warrant the cost of integrating ceramic matrix composite into the design and not too hot to overheat the material is the high pressure stage 2 (HP2) of the turbines. The material could be used in high pressure stage 2 blades, seal segments and nozzle guide vanes (NGVs).

In some embodiments, ceramic matrix composite may have poor impact tolerance. This vulnerability could result in two key issues: (1) It may increase the probability of pieces of ceramic matrix composite breaking off, creating more domestic object damage (DOD) for components downstream; and (2) The nozzle guide vanes may be liable to holing, which could cause insufficient cooling or ingestion of hot gases onto the spars inside, potentially leading to an in-flight shut down (IFSD).

The present disclosure details a method of inserting impact resistant fibres into the ceramic matrix composite vane where the vane would be most vulnerable to impact damage. In some embodiments, the areas most susceptible to impact damage may include the leading edge tip and the suction side surface towards the trailing edge. These areas may be thickened.

In some embodiments, this method provides several benefits: The impact resistant fibre is protected from the highest temperatures by the ceramic matrix composite outer layer 36, 236; there may be, in effect, at least two separate layers of ceramic matrix composite which provides thermal protection even if an initial impact damages the first two layers; and minimum effect to aerodynamics whilst improving impact tolerance.

In some embodiments, the entire trailing edge is constructed with the impact resistant material, with a thin layer of ceramic matrix composite surrounding the outside. This allows the trailing edge to be have increase impact resistance while still retaining the thermal resistance due to the composite outer layer.

Unlike other embodiments designed to protect ceramic matrix composite components from damage, some embodiments may place the impact resistant fibres 58, 60, 226 between composite fibres. This may provide protection from impacts but also keep the impact fibres safe from the higher end temperatures the ceramic matrix composite material may see. In some embodiments, the impact resistant fibres are located only in the most vulnerable regions of the components; which may reduce cost, complexity, and weight of components compared to reinforcing the entire component.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An aerofoil assembly for use in a gas turbine engine, the aerofoil assembly comprising
    an aerofoil comprising ceramic matrix composite materials and extending radially relative to an axis, the aerofoil having a leading edge, a trailing edge spaced apart axially from the leading edge, a pressure side interconnecting the leading edge and the trailing edge, and a suction side spaced apart circumferentially from the pressure side and interconnecting the leading edge and the trailing edge, the aerofoil shaped to define an inner surface that forms an internal cavity for receiving cooling air therein and an outermost surface configured to interact with hot gases conducted through the gas turbine engine, and
    a first reinforcement inset at least partially located in the suction side of the aerofoil between the inner surface and the outermost surface to resist damage to the aerofoil assembly due to objects impacting the aerofoil assembly, the first reinforcement inset comprising at least one material different than the ceramic matrix composite materials,
    wherein the ceramic matrix composite materials of the aerofoil surround the first reinforcement inset such that the entire first reinforcement inset is in direct contact with the ceramic matrix composite materials of the aerofoil to cause the first reinforcement inset to be insulated from the hot gases, and
    the aerofoil assembly further comprising a second reinforcement inset located in the leading edge of the aerofoil between the inner surface and the outermost surface to resist damage to the aerofoil assembly due to objects impacting the aerofoil assembly, wherein the ceramic matrix composite materials of the aerofoil surround the second reinforcement inset such that the entire second reinforcement inset is in direct contact with the ceramic matrix composite materials of the aerofoil to cause the second reinforcement inset to be insulated from the hot gases.

2. The aerofoil assembly of claim 1, wherein the first reinforcement inset is discrete from the second reinforcement inset.

3. The aerofoil assembly of claim 1, wherein the aerofoil includes a first layer of ceramic matrix composite materials and a second layer of ceramic matrix composite materials arranged around the first layer of ceramic matrix composite materials, the first layer of ceramic matrix composite materials and the second layer of ceramic matrix composite materials are aerofoil shaped, and the first reinforcement inset is located between the first layer of ceramic matrix composite materials and the second layer of ceramic matrix composite materials.

4. The aerofoil assembly of claim 1, wherein the first reinforcement inset is located in at least one of the suction side, pressure side, and trailing edge of the aerofoil.

5. The aerofoil assembly of claim 4, wherein the first reinforcement inset includes a first side surface, a second side surface, and a receiver surface, the first side surface and the second side surface converge toward one another and meet adjacent the trailing edge of the aerofoil, and the receiver surface is concave and contacts directly the first side surface and the second side surface to interconnect the first side surface and the second side surface.

6. The aerofoil assembly of claim 1, wherein the first reinforcement inset comprises at least one of silicon carbide fibre, silicon carbide nitride, a monofilament titanium ceramic matrix composite, a safricon fibre, and a non-oxide ceramic fibre.

7. An aerofoil assembly for use in a gas turbine engine, the aerofoil assembly comprising
    an aerofoil comprising ceramic matrix composite materials and extending radially relative to an axis, the aerofoil having a leading edge, a trailing edge spaced apart axially from the leading edge, a pressure side interconnecting the leading edge and the trailing edge, and a suction side spaced apart circumferentially from the pressure side and interconnecting the leading edge and the trailing edge, the aerofoil shaped to define an inner surface that forms an internal cavity for receiving cooling air therein and an outermost surface configured to interact with hot gases conducted through the gas turbine engine, and
    a first reinforcement inset at least partially located in the suction side of the aerofoil between the inner surface and the outermost surface to resist damage to the aerofoil assembly due to objects impacting the aerofoil assembly, the first reinforcement inset comprising at least one material different than the ceramic matrix composite materials,
    wherein the ceramic matrix composite materials of the aerofoil surround the first reinforcement inset such that the entire first reinforcement inset is in direct contact with the ceramic matrix composite materials of the aerofoil to cause the first reinforcement inset to be insulated from the hot gases,
    wherein the entire first reinforcement inset is located in the suction side of the aerofoil,
    wherein the first reinforcement inset extends between a first end and a second end and includes a curvilinear outer inset surface and a curvilinear inner inset surface that contact each other to form a first point at the first end and a second point at the second end.

8. An aerofoil assembly comprising
    an aerofoil comprising ceramic matrix composite materials, the aerofoil includes a first layer of ceramic matrix composite materials and a second layer of ceramic matrix composite materials arranged around the first layer, the first layer contacts the second layer at a first location and at a second location spaced apart from the first location, and the first layer is spaced apart from the second layer at a third location between the first location and second location to define a inset-receiving space between the first location and the second location, and a first reinforcement inset located in the inset-receiving space between the first layer and the second layer and engaged with the first layer and the second layer, wherein the aerofoil has a leading edge, a trailing edge spaced apart axially from the leading edge, a pressure side interconnecting the leading edge and the trailing edge, and a suction side spaced apart circumferentially from the pressure side and interconnecting the leading edge and the trailing edge, and the first reinforcement inset is located in the leading edge of the aerofoil.

9. The aerofoil assembly of claim 8, wherein the first reinforcement inset contacts directly the first layer and the second layer.

10. The aerofoil assembly of claim 8, wherein the first reinforcement inset is crescent shaped.

11. The aerofoil assembly of claim 8, wherein the second layer provides an outermost surface of the aerofoil assembly, the first layer has a first thickness, the second layer has a second thickness, and the first thickness is greater than the second thickness.

12. The aerofoil assembly of claim 8, further comprising a second reinforcement inset, wherein the second reinforcement inset extends at least partway along the suction side of the aerofoil toward the trailing edge.

\* \* \* \* \*